J. R. HOLLEY.
PERCOLATOR.
APPLICATION FILED MAR. 24, 1910.

1,008,267.

Patented Nov. 7, 1911.

WITNESSES:

INVENTOR.
J. R. Holley
BY
ATTORNEY

UNITED STATES PATENT OFFICE.

JULIAN R. HOLLEY, OF BRISTOL, CONNECTICUT, ASSIGNOR TO THE BRISTOL BRASS COMPANY, OF BRISTOL, CONNECTICUT, A CORPORATION OF CONNECTICUT.

PERCOLATOR.

1,008,267.  Specification of Letters Patent.  Patented Nov. 7, 1911.

Application filed March 24, 1910. Serial No. 551,303.

*To all whom it may concern:*

Be it known that I, JULIAN R. HOLLEY, a citizen of the United States, and resident of Bristol, in the county of Hartford and State of Connecticut, have invented certain new and useful Improvements in Percolators, of which the following is a full, clear, and exact specification.

This invention relates to percolators and similar apparatus, and more especially to what is generally known as the "pump mechanism" thereof, and it has for one of its objects the provision of an improved device of this character whereby small quantities of liquid may be consecutively heated to a boiling point so as to generate steam which will become effective in projecting hot water through the ejector-tube of the percolator over the ground coffee or other material contained in a receptacle provided therefor in the top portion of the vessel or pot.

The invention has, furthermore, for its object the provision of a heating-chamber in which such small quantities of liquid are to be heated as above described, and the top of which is movably mounted so as to yield during the impulses of steam pressure generated in the chamber, this yielding movement serving at the same time to shut off the supply-passage through which water enters into the heating-chamber.

As a matter of fact the present organization is such that the roof of the heating-chamber constitutes in reality a valve which normally gravitates to open so as to admit the liquid into the chamber but which will be closed by the impulses of the steam as above mentioned.

Further objects of the invention will hereinafter appear and the means of their attainment be particularly pointed out in the claims.

Briefly stated, the present invention is adapted for use in connection with coffee percolators in which a quantity of ground coffee is contained within a tray above the water level in the main pot, while small quantities of such liquid are heated to a high degree in a special chamber provided therefor and are subsequently projected through the ejector-tube to a point above the coffee, so that this hot water will then be distributed over the same and gradually drip back into the main body of the liquid in the vessel or pot and at the same time absorb the soluble elements of the coffee.

The invention is clearly illustrated in the accompanying drawings in which similar characters denote similar parts, and in which—

Figure 1:
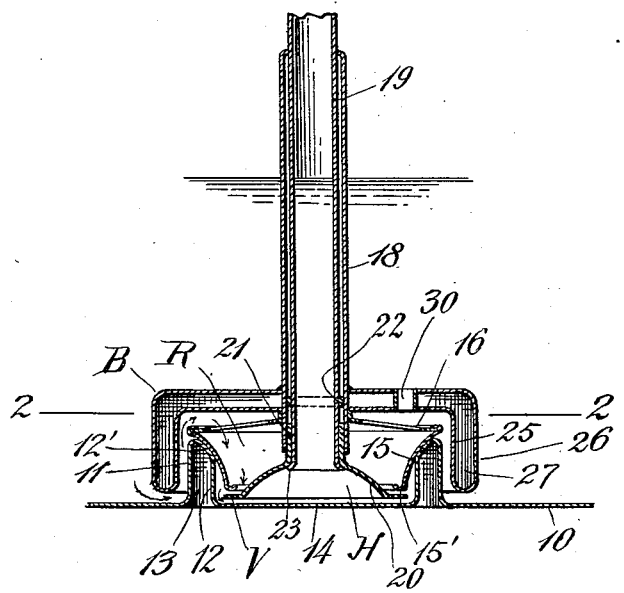
Figure 2:
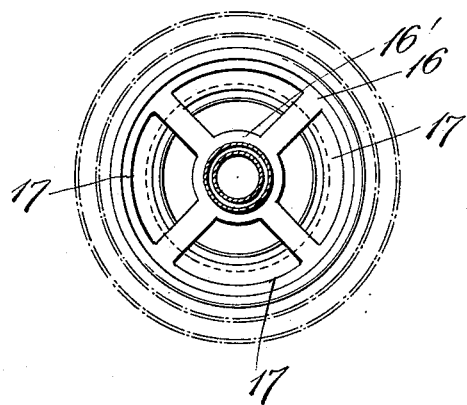

Figure 1 is a central vertical section of my improved pump mechanism assembled with the bottom portion of the pot, and Fig. 2 is a top view or horizontal section of the pump mechanism proper on line 2—2 of Fig. 1.

In the drawings, the numeral 10 denotes the bottom plate of the main vessel or pot which contains the liquid to be converted into coffee-beverage, through the process of percolation, this pot being indented upwardly to form an annular wall 11 and another wall 12 united at their tops but isolated from each other by an annular air-space 13, so that consequently the water in the cup formed by the annular wall 12 will be substantially separated or isolated from the main body of water in the main pot. The lower portion of the cup formed by the wall 12, constitutes the heating-chamber H having the bottom or heating plate 14 which is also a part of the main vessel or bottom 10, and the pump mechanism proper is seated within this cup as clearly shown in Fig. 1.

The pump mechanism comprises a shell 15 which is preferably conical in shape and adapted to be seated against the upper or outwardly flared portion 12' of the cup wall 12 so that no leak shall occur at that point. The shell 15 carries at its upper end a spider 16 having comparatively large openings 17 (see Fig. 2) to permit free access of the liquid into the interior of the shell 15. The central portion 16' of the spider 16 is attached to a tube 18 which is slightly spaced from, and surrounds, the ejector-tube 19, the lower end of which projects into the heating-chamber H.

The lower end of the shell 15 is curled as at 15' to serve as a seat for a valve-plate V formed by laterally extending or flanging a dome-member 20 which constitutes the roof of the heating-chamber H and which is mounted for vertical movement on the end of the ejector-tube 19 on which it is guided, as for instance by a sleeve or hub 21 entering into the space between the ejector-tube 19 and the air-tube 18 above mentioned. In order to insure free movement of the hub 21 on the tube 19, I preferably employ a spacer-ring 22 whereby the lower end of said tubes will be held in concentric relation and whereby the structure in its entirety will be greatly stiffened.

Different means may be employed for holding the dome-plate 20 from falling off the tube 19 when the pump mechanism is removed from the bottom of the pot, and I preferably employ the construction shown in Fig. 1 in which the lower end of the tube 19 is illustrated as being slightly expanded or flared as at 23 to serve as a shoulder against which the plate 20 may come to rest and thus gage the amount of free opening existing between the underside of the curl 15' and the upper surface of the valve-flange V.

Another feature which has been duly taken cognizance of is the space normally existing between the lower surface of the valve V and the upper surface of the cup-bottom 14, this relationship being such as to afford sufficient room for the passage of liquid around the edge of the valve into the heating-chamber H.

Surrounding the annular air-space 13, and covering the entire pump mechanism thus far described, is a hood or bonnet B preferably formed of a pair of spaced cup-shaped members 25 and 26 so as to leave an inclosed air-space 27 which acts as a means for reducing the tendency of lowering the temperature of the water in the shell 15 as it would otherwise be influenced by the water in the main pot, and in order to facilitate the entrance of liquid from the main pot into the interior of the shell 15 and at the same time ease the lifting operation of the valve V under the impulse generated in the heating-chamber H, I deem it expedient to provide a conduit 30 in the nature of a tube extending through the horizontal portions of the cup-plates 25 and 26 and establishing free and direct communication between the water in the pot and the interior of the shell 15.

The operation of the device is substantially as follows:—In the condition of the mechanism shown in Fig. 1 the water in the ejector-tube 19 stands on a level with the water in the main pot and the shell 15, which in connection with the hood B forms what may be termed a receiving-chamber R, is filled, as is also the heating-chamber H, and the valve V is in its lowermost position so that free communication is established between the receiving-chamber R and the heating-chamber H. When heat is now applied to the bottom 14 of the heating-cup, the small amount of water contained in this cup or chamber is naturally heated very rapidly and the bubbles established through the generation of steam will rise to the top and throw the liquid contained in the ejector-tube 19. As the plate 14 becomes hotter the generation of steam in the heating-chamber H will increase until finally it becomes so rapid that a pressure is established in the heating-chamber, sufficient to lift the roof of this chamber bodily, which action results in shutting-off all communication between the receiving-chamber R and the heating-chamber H, so that consequently, the only exit which now exists for the steam is through the ejector-tube 19. This quick generation of steam manifests itself into an impulse whereby the water in the ejector-tube is propelled upward and until it leaves the end of the tube, by which time the force of the steam has spent itself, so that consequently, the valve V can then gravitate back into position shown in Fig. 1 and permit fresh water to enter the heating-chamber H where the generation of steam is again repeated as before. Practice has demonstrated that the impulses follow very rapidly upon each other, so that consequently the water in the main pot will also become heated in a very short time. It has further been demonstrated that this present mechanism will throw large quantities of water until a high degree of temperature has been reached, a feature which is highly essential in an apparatus of this nature in which the principal aim is not only to bring large bodies of water into coöperation with the ground coffee but at the same time to bring the temperature of the water in the main pot to as high a degree as possible in the shortest possible time. These conditions have all been fulfilled by the present mechanism which, furthermore, has the advantage of being very simple in construction.

Many changes may be made in the particular assembling and construction of the several component elements of the device, without departing from the spirit of the invention.

I claim:—

1. In a percolator, the combination with a vessel or pot having a cup-shaped bottom, and an ejector-tube projecting thereinto, of a movable dome-member in said cup and forming with the pot bottom a heating-chamber, a shell seated on the walls of said cup and having in its bottom an aperture, said dome-member constituting a valve for closing said aperture.

2. In a percolator, the combination with a vessel or pot having a cup-shaped bottom, an ejector-tube projecting thereinto, and a shell having in its bottom an aperture seated on said wall of said cup, of a dome-member in said cup and guided for movement on said tube to close said aperture by the rising movement of the dome-member under an impulse of steam generated below said member.

3. In a percolator, the combination with a vessel or pot having a cup-shaped bottom, and an ejector-tube projecting thereinto, of a dome-member in said cup and mounted for movement on said ejector-tube, the lower end of said ejector-tube being expanded to limit the downward movement of said dome-member and to hold the same thereon and a shell seated on the wall of said cup and having an aperture adapted to be closed by the upward movement of said dome-member.

4. In a percolator, the combination with a vessel or pot having a cup-shaped bottom, and an ejector-tube projecting thereinto, of a dome-member in said cup, a shell seated on the wall of said cup and having an aperture in its bottom for admitting liquid into said cup and below said dome-member, said dome-member having a tubular extension surrounding the end of the ejector-tube for guiding said member on said tube.

5. In a percolator, the combination with a vessel or pot having a cup-shaped bottom, and an ejector-tube projecting thereinto, of a conical shell open at top and bottom fitted into said cup, and having its lower edge spaced from the bottom of said cup, a spider for supporting said shell in fixed position relative to the ejector-tube, and a dome-shaped member constituting a valve coöperative with the lower edge of said shell and mounted for movement on said ejector-tube.

6. A percolator comprising a vessel or pot having a cup-shaped bottom, a hood covering the top of said cup, an ejector-tube projecting through said hood into said cup, a shell open at its top and bottom seated on the wall of said cup and permitting the flow of liquid into the bottom of said cup, and a dome-shaped member constituting a valve dividing the interior of said cup into a receiving-chamber and a heating-chamber and mounted for movement on the ejector-tube to close said open bottom by an impulse of steam in the heating-chamber and normally to gravitate to open said bottom.

7. A percolator comprising a vessel or pot having a cup-shaped bottom, a hood covering the top of said cup, an ejector-tube projecting through said hood into said cup, an open-bottom shell having apertures in its top permitting the flow of liquid into the bottom of said cup, and a dome-shaped member constituting a valve dividing the interior of said cup into a receiving-chamber and a heating-chamber and mounted for movement on the ejector-tube to close said open-bottom by an impulse of steam in the heating-chamber and normally to gravitate to open the same, a conduit through said hood to establish direct communication with the liquid above said hood and the interior of said cup.

8. In a percolator, the combination with a vessel or pot having a cup-shaped bottom, and an ejector-tube projecting thereinto, of a dome-member movable in said cup and forming with the pot-bottom a heating-chamber, and an open-bottom shell for admitting liquid into the bottom of said cup and below said dome-member, said dome-member having a flange extending beyond the confines of said shell and constituting a valve therefor.

JULIAN R. HOLLEY.

Witnesses:
C. F. SCHMELZ,
A. D. WILSON.

Copies of this patent may be obtained for five cents each, by addressing the "Commissioner of Patents, Washington, D. C."